(12) United States Patent
Kim et al.

(10) Patent No.: US 9,921,123 B2
(45) Date of Patent: Mar. 20, 2018

(54) PIPE MAPPING PROBE APPARATUS FOR SEARCHING PIPE ROUTE POSITION

(71) Applicant: WATER RESOURCES FACILITIES & MAINTENANCE CO., LTD., Seongnam-si, Gyeonggi-do (KR)

(72) Inventors: Jin Won Kim, Seongnam-si (KR); Young Soo Seok, Hanam-si (KR); Kyung Sob Lee, Namyangju-si (KR); Se Wan Lee, Yongin-si (KR); Dong Hyun Kim, Yongin-si (KR); Kyung Seok Oh, Suwon-si (KR); Yong Gun Lee, Yongin-si (KR); Jung Hun Oh, Jinju-si (KR); Gwang Ho Jin, Seoul (KR); Ja Yong Koo, Seoul (KR); In Hwan Hyun, Seoul (KR)

(73) Assignee: WATER RESOURCES FACILITIES & MAINTENANCE CO., LTD., Seongnam-si, Gyeonggi-Do (KR)

( * ) Notice: Subject to any disclaimer, the term of this patent is extended or adjusted under 35 U.S.C. 154(b) by 189 days.

(21) Appl. No.: 14/929,379

(22) Filed: Nov. 1, 2015

(65) Prior Publication Data
US 2016/0282122 A1    Sep. 29, 2016

Related U.S. Application Data

(63) Continuation of application No. PCT/KR2015/003986, filed on Apr. 21, 2015.

(30) Foreign Application Priority Data

Mar. 27, 2015 (KR) .................. 10-2015-0043307

(51) Int. Cl.
*G01C 21/14* (2006.01)
*G01C 21/20* (2006.01)
*G01M 3/00* (2006.01)

(52) U.S. Cl.
CPC ......... *G01M 3/005* (2013.01); *F16L 2201/30* (2013.01)

(58) Field of Classification Search
CPC ........................... G01M 3/005; F16L 2201/30
See application file for complete search history.

(56) References Cited

U.S. PATENT DOCUMENTS

| 4,717,875 A * | 1/1988 | Lara | .................. E21B 47/022 324/220 |
| 4,747,317 A * | 5/1988 | Lara | .................. G01C 21/16 324/220 |

(Continued)

FOREIGN PATENT DOCUMENTS

KR    10-2012-0115743 A    10/2012

*Primary Examiner* — John Breene
*Assistant Examiner* — Mohammad Islam
(74) *Attorney, Agent, or Firm* — LRK Patent Law Firm

(57) ABSTRACT

A Pipe Mapping Probe Apparatus for Searching Pipe Route Position includes: a first disc fitted and fastened on a shaft member thread-fastened to the inner side of a connection shaft at a first side of an internal body of a first pig; a cap coupled to a side of the shaft member outside the first disc; a first pig coupled to the shaft member; elastic members composed of three flexible springs coupled to a second side of an external body of the first pig; a cable that electrically connects a battery, a sensor unit, and a control board of the first pig and an encoder of a second pig, is connected with the battery through a first cable socket coupled to the external body of the first pig, and is connected to an encoder through a second cable socket disposed at the center of the second plate coupled to a first side of the second pig and through an encoder socket on the top of the encoder disposed in an internal body of the second pig; the second pig coupled to second sides of the elastic members at the first side of the second pig and coupled to a second plate, which is coupled (Continued)

to the second cable socket at the center, at the first side; and a second disc disposed on a second side of the external body of the second pig.

7 Claims, 10 Drawing Sheets

(56) References Cited

U.S. PATENT DOCUMENTS

| | | | | |
|---|---|---|---|---|
| 4,945,775 | A * | 8/1990 | Adams | E21B 47/00 73/865.8 |
| 6,243,657 | B1 * | 6/2001 | Tuck | G01N 29/2412 324/207.13 |
| 6,553,322 | B1 * | 4/2003 | Ignagni | F16L 55/48 701/32.4 |
| 9,733,216 | B2 * | 8/2017 | Di Lullo | G01N 27/82 |
| 2003/0233894 | A1 * | 12/2003 | Tezuka | E21B 47/024 73/865.8 |
| 2004/0261547 | A1 * | 12/2004 | Russell | F17D 5/00 73/865.8 |
| 2014/0013872 | A1 * | 1/2014 | Thursby | G01M 3/005 73/865.8 |
| 2014/0078499 | A1 * | 3/2014 | Tunheim | G01N 21/31 356/241.1 |
| 2016/0245718 | A1 * | 8/2016 | Chan | G01M 3/38 |

* cited by examiner

PIPE MAPPING PROBE APPARATUS FOR SEARCHING PIPE ROUTE POSITION

CROSS-REFERENCE TO RELATED APPLICATIONS

This application is a continuation of International Application No. PCT/KR2015/003986, filed Apr. 21, 2015, which claims priority to Korean Patent Application No. 2015-0043307, filed on Mar. 27, 2015, the disclosures of which are incorporated herein by reference in their entireties.

BACKGROUND OF THE INVENTION

1. Field of the Invention

The present invention relates of Pipe Mapping Probe Apparatus to accurately finding the position of a pipeline in 3 Dimension Map. In general, tap water pipelines and sewer pipelines are embedded under the ground and it is difficult to locate those pipelines visually or through a communication means. And It is impossible to find position of pipe since The pipelines are embedded under the Ground. Accordingly, it is important to find the position of the entire pipelines to maintain and exchange the Pipeline.

2. Description of Related Art

As a related art of the present invention, there is Korean patent application Publication No 10-2012-0115743. FIG. 1 is a Pipe Mapping Probe Apparatus of the above related art. In FIG. 1. The Pipe Mapping Probe Apparatus includes: a absorbing element 12 that is fastened on a end part of first Pig; the one and part of a first pig 10 coupled to the absorbing element 12; The another end part a first Pig 10 is fastened to a first guide plate 70 and elastic members 50 that are composed of three flexible springs coupled to a second side of an external body 11 of the first pig; the second pig 30 that is coupled to second sides of the elastic members at the first side of the second pig 30 and coupled to a third guide plate 70, which is coupled to the second guide plate 70 at the one side of center, at the first side; and a second guide 70 that is disposed on a first side of the second pig 30.

As a related art of the present invention, FIG. 2 is a diagram showing a system for putting and taking a mapping probe into and out of a pipeline of the related art. In FIG. 2, a system for putting and taking a mapping probe into and out of a pipeline of the related art includes a launcher 100 for putting a mapping probe P, which collects various data for 3D mapping while moving along a pipeline (for example, a tap water pipeline under the ground), into a pipe line 1 and a receiver 200 for taking the mapping probe P out of the pipeline. In this configuration, first and second main valves 3 and 5 for respectively stopping and allowing water supply, are disposed at the start point and the end point of the pipeline in a mapping section. The launcher 100 includes a first checking section 110 and a stopper 150, in which the first checking section 110 is disposed between the first main valve 3 and an end of a pipeline 1 to be mapped (hereafter, referred to as "object pipeline") which is the start point of a mapping section of the pipeline 1. The first checking section 110 has an entrance hole having a predetermined diameter at the top through which the mapping probe P is put inside and the entrance hole is opened/closed by a door 130. The first checking section 110 has a first pressure gauge 113 at a side and the first pressure gauge 113 can indirectly find the current position of the mapping probe P by finding out a pressure change in the object pipeline 1 in cooperation with a second pressure gauge 217 in a body 210 of the receiver 200. The door 130 has an air discharge valve 131 that communicates with the first checking section 110, on the top, and an eye nut is coupled to the door 130 to easily open/close the door 13. The stopper 150 temporarily forcibly fixes the mapping probe P put in the first checking section 110 through the entrance hole. The stopper 150 has a slide shaft disposed through the door 130 and a pressure bolt moving up/down the slide shaft. In this configuration, the pressure bolt is connected to a movable bolt to change the position. The stopper 150 includes a pressure member coupled to the lower end of the slide shaft and fixing a portion of the mapping probe P under pressure in the launcher. In this configuration, the pressure member is connected to the lower end of the slide shaft by a hinge H. The receiver 200 includes a body 210, a door 230, a pair of flow control ports, a rear discharge port 270, and a shock-absorbing unit 290. The body 210 communicates with an extension line 171 diverging from the second checking section 170 and, has an extraction hole for taking the mapping probe P out of the body 210 at the top and a door 230 for opening/closing the extraction hole. The second pressure gauge 217 is disposed at a side of the body 210. In this configuration, a second main valve is disposed at a side of the second checking section 170, so it controls stopping/ allowing of water supply in cooperation with the first main valve 3. An air discharge valve 231 that communicates with the body 210 is disposed on the top of the door 230 and an eye nut is coupled to the door 230 to easily open/close the door 230. A pair of flow control ports controls the speed of the mapping probe P moving in the object pipeline 1 by changing a flow speed by controlling discharge of water filled in the object pipeline 1. The pair of flow control ports has the same size and length and symmetrically diverge from the body 210 to both side of the body 210. A valve and a flow meter for controlling discharge of water from the object pipeline 1 are disposed in each of the pair of flow control ports. A worker can maintain a uniform flow rate in the object pipeline 1 even if mapping is performed several times, by checking a flow speed in the object pipeline 1 from the flow meter and controlling the flow speed. The rear discharge port 270 discharges the water in the body 210 so that the mapping probe P reaching the body 210 is, guided into the body 210 and fully docked. In this configuration, the rear discharge port 270 has a valve 271 for controlling discharge of water. The shock-absorbing unit 290 prevents a rapid increase of the final hit value collected by the mapping probe P by stopping the mapping probe P docked in the body 210 and by absorbing shock power applied to the mapping probe P when it is stopped. The shock-absorbing unit 290 includes a hitting member and a plurality of arrival indication rods. The hitting member is disposed in the body 210 substantially at a height corresponding to the center of the front end of the mapping probe. The hitting member may be made of a material having predetermined elasticity. The arrival indication rods are disposed in the body 210 to elastically support the hitting member so that the hitting member is moved in parallel with the movement of the mapping probe P. In this configuration, a coil spring is disposed between the hitting member and the arrival indication rod. Further, the arrival indication rods partially protrude out of the body 210, and they further protrude out of the body 210 when the mapping probe P hits against the shock-absorbing unit 290 after being docked in the body 210, so a worker can easily visually determine that the mapping probe P has reached the receiver 200.

SUMMARY OF THE INVENTION

The related prior art is a problem not to find the position of pipe line getting by sensor. And the related prior art is a problem disconnecting cable by the change of speed of water flow at the inside of pipeline. Accordingly, the goal of The Pipe Mapping Probe Apparatus for Searching Pipe Route Position can get the data of position of pipe embedded underground at the Map And the second goal of the Pipe Mapping Probe Apparatus for Searching Pipe Route Position can get the distance of moving the probe device and prevent the signal error by using, water resistant elements of Connection parts of Cables.

A flowchart illustrating a Pipe Mapping Probe Apparatus for Searching Pipe route position of the present invention is provided. In order to achieve the above object, according to one aspect of the present invention, there is provided

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

A method of tracing the position of a pipeline using a mapping probe of the present invention having the objects described above is described with reference to FIGS. 3 to 10.

Figure 1:
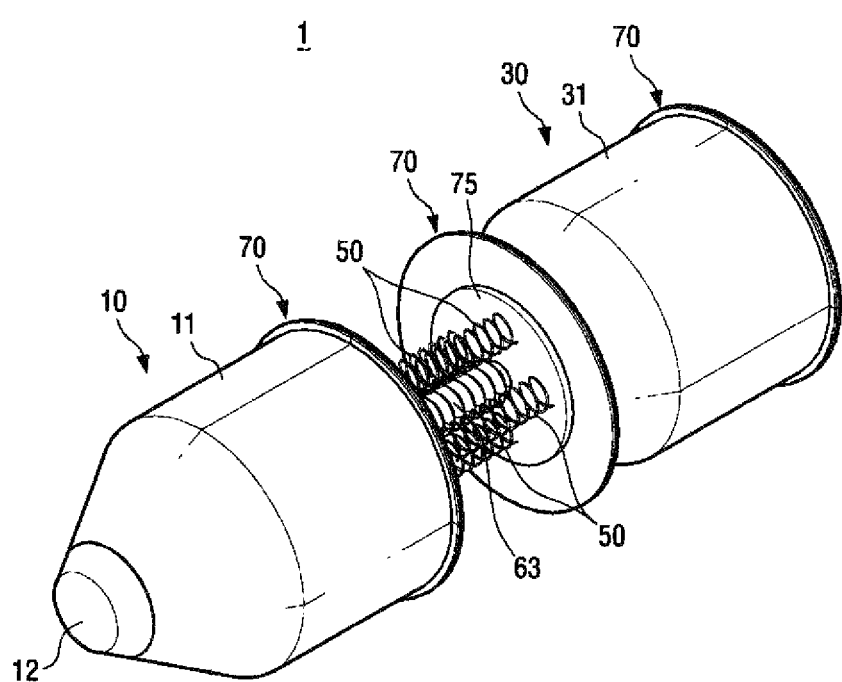
FIG. 1 is a diagram illustrating a system for putting and taking a mapping probe into and out of a pipeline of the related art.
Figure 2:
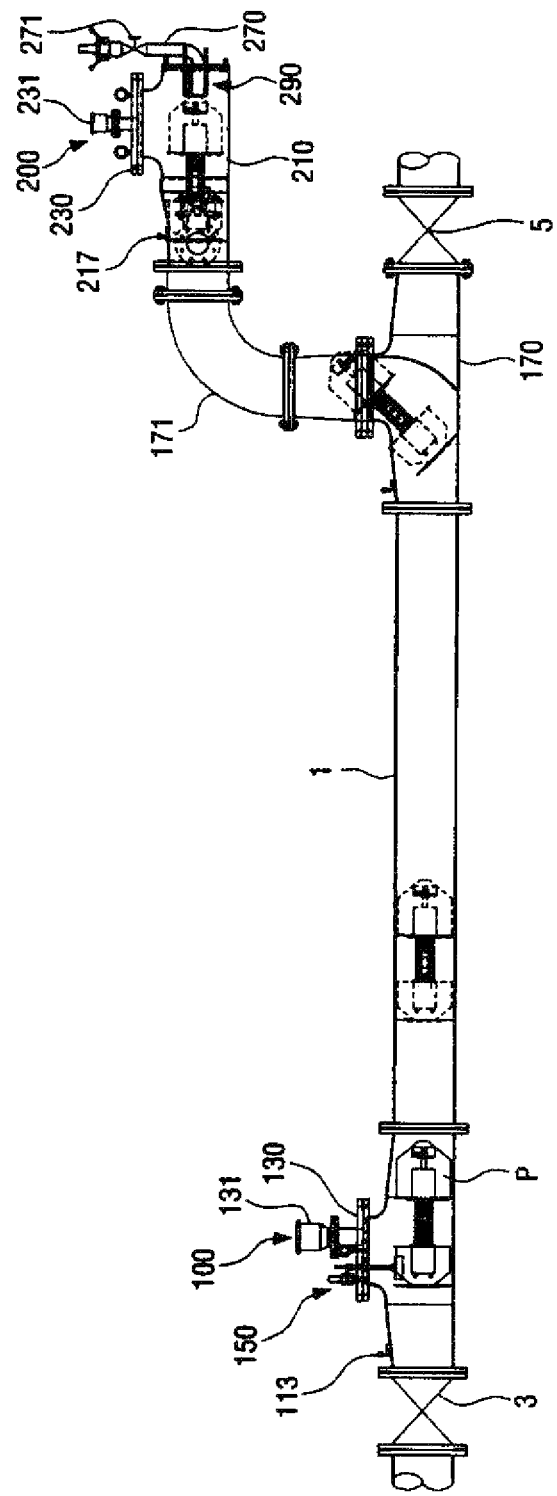
FIG. 2 is a flowchart illustrating a process of moving a mapping probe through a pipeline.
Figure 3:
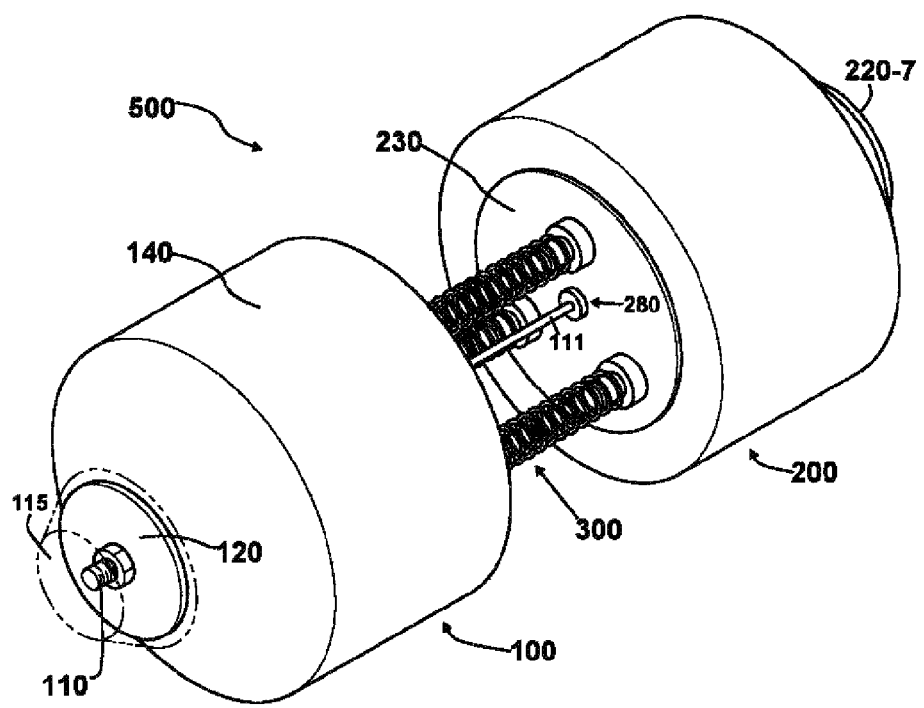
FIG. 3 is a perspective view of a mapping probe to be applied to the present invention.

FIG. 3 is a perspective view of a mapping probe for finding a position of a pipeline the present invention. Referring to FIG. 3, a mapping probe 500 for finding a position of a pipeline of the present invention includes: a first disc 120 that is fitted and fastened on a shaft member 110 thread-fastened to the inner side of a connection shaft at a first side of an internal body 140-1 of a first pig 100; a cap 115 coupled to a side of the shaft member 110 outside the first disc; a first pig 100 coupled to the shaft member, elastic members 300 that are composed of three flexible springs coupled to a second side of an external body 140 of the first pig; a cable 111 that electrically connects a battery, a sensor unit, and a control board of the first pig 110 and an encoder of a second pig, is connected with the battery through a first cable socket coupled to the external body of the first pig, and is connected to an encoder 260 through a second cable socket 280 disposed at the center of the second plate coupled to a first side of the second pig 200 and through an encoder socket 264 on the top of the encoder disposed in an internal body 240-1 of the second pig; the second pig 200 that is coupled to second sides of the elastic members at the first side of the second pig 200 and coupled to a second plate 230, which is coupled to the second cable socket 280 at the center, at the first side; and a second disc 220-7 that is disposed on a second side of the external body 240 of the second pig.

Figure 4:
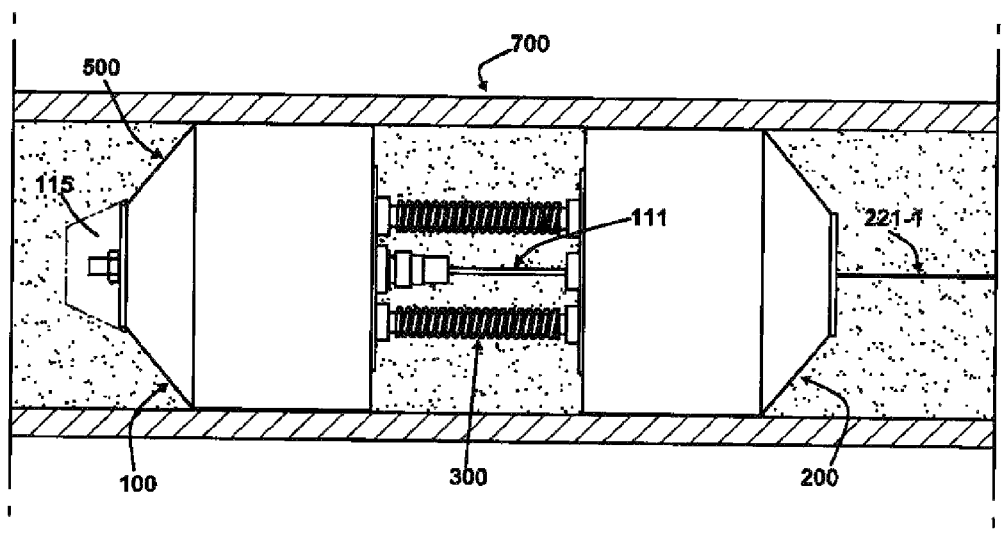
FIG. 4 is a view showing the mapping probe to be applied to the present invention in a pipeline.

FIG. 4 shows the configuration of the mapping probe, for finding a position of a pipeline of the present invention in a pipeline. Referring to FIG. 4, according to the mapping probe 500 for finding a position of a pipeline of the present invention, when water pressure is applied in a pipeline 700, a steel wire wound on a reel in the internal body of the second pig 200 is released from the reel and the mapping probe can be moved forward by stream of the water. As described above, the mapping probe 500 for finding a position of a pipeline of the present invention creates acceleration information and angular speed information along three-dimensional axes of the mapping probe in real time through, a sensor unit (composed of three acceleration sensors and three gyro sensors) while being moved by the water pressure through the pipeline 700 under the ground and keeps the information in a memory. Further, the mapping probe creates movement distance information from a movement start point (origin) through the encoder 260 and keeps the information in the memory. Accordingly, it is possible to find the information about the actual position of the pipeline on a map by mapping, the information kept in the memory to geographic information in a server.

Figure 5:
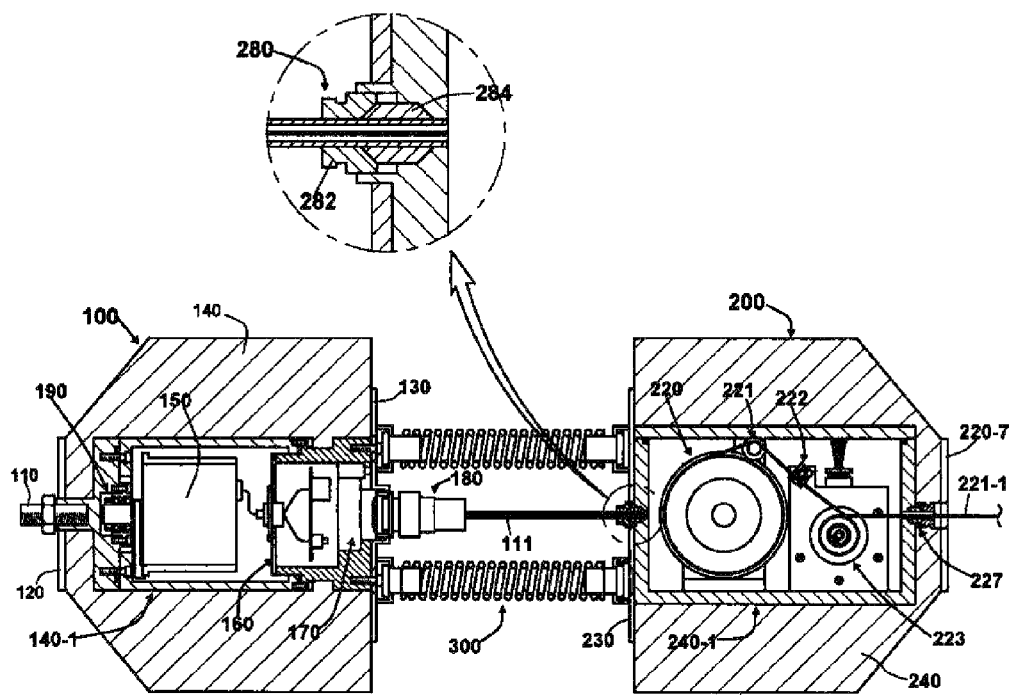
FIG. 5 is a cross-sectional view of the mapping probe to be applied to the present invention.

FIG. 5 is a cross-sectional view of the mapping probe for finding a position of a pipeline the present invention. Referring to FIG. 5, the mapping probe 500 for finding a position of a pipeline includes: a sensor unit 150 that has three acceleration sensors and three gyro sensors, is coupled to a first side of a internal body 140-1 by a coupling 190, has an auto-balancing on the front 155 to keep balance even if the mapping probe inclines left or right a control board 160 that receives and keeps acceleration information of three-dimensional axes created by the three acceleration sensors in a memory and receive and keeps angular speed information of the three-dimensional axes created by the three gyro sensors in the memory, includes a controller receiving and keeping movement distance information from an encoder 260 of a second pig 200 in the memory, and is coupled to a second side of the internal body 140-1; a first pig 100 that is composed of the sensor unit, a battery coupled to the control board to supply power to the control board and the encoder, an external body 140 surrounding the internal body and the battery, a first disc 120 fitted on a connection shaft coupled to the internal body 140-1 on a first side of the external body, a shaft member 110 thread-fastened to the inner side of the connection shaft, and a first plate 130 coupled to a second side of the external body 140 and having a first cable socket 180 through which a cable is disposed; a cable 111 that supplies power from the battery to the acceleration sensors, the gyro sensors, the control board, and the encoder and transmits the information created by the acceleration sensors, the gyro sensors, and the encoder to the control board 160; elastic members 300 that are springs connecting the first pig 100 and a second pig 200 to each other; and the second pig having a second plate 230, which has a second cable socket 280 on second sides of the elastic members, on a first side, and including therein a reel 220 that winds/releases a steel wire 221-1, a tension adjuster 224 that adjusts rotation of the reel, a first guide 221 that is disposed on the reel and guides the steel wire released, a guide hole 222 that guides the steel wire released from the first, guide to the center, a second guide 223 that guides the steel wire released from the guide hole to a steel wire socket 227, an encoder socket 264 through which the cable 111 is inserted for connection with the encoder, an internal body 240-1 of the second pig that accommodates an encoder 260 calculating a movement distance of the mapping probe in a pipeline on the basis of the length of the steel wire 221-1 released from the reel 220 and transmitting information of the movement distance to the control board 160 through a cable, an external body 240 that is disposed outside the internal body 240-1, and a second disc 220-7 that is coupled to a second side of the external body 240. According to the mapping probe 500 of the present invention, when the steel wire is fixed to the launcher at the origin of a pipeline, the mapping probe is inserted into the pipeline, and then water pressure is applied to the pipeline, the mapping probe moves through the pipeline. Further, while the mapping probe moves through the pipeline, acceleration information of three-dimensional axes, angular speed information of the three-dimensional axes, and movement information of the mapping probe are created and kept in a memory. The sensor unit of the mapping probe for finding a position of a pipeline to be applied to the present invention is described in detail. The mapping probe includes: the sensor unit 150 that is composed of three acceleration sensors creating acceleration information about three-dimensional axes (S, y, z) and three gyro sensors creating angular speed information of three-dimensional rotation axes (x, y, z) and that is coupled to the inner body by a bearing; and the control board 160 that receives the acceleration information of the three-dimensional axes and the angular speed information of the three-dimensional axes created by the sensor unit and the movement distance information of the mapping probe created by the encoder 260 of the second pig 200, keeps the information in the memory, and is coupled to the second side of the internal body of the first pig 100. In the second cable socket 280, a urethane pad 284 having the shape of a top at a side and a hole therein is inserted in an inclined groove 283 of a pad support member 282, which is disposed at the centers of the second plate 230 and the first side of the internal body 240-1 and has a hole and the inclined groove at its center, and a cable is disposed through the holes of the pad support member and the urethane pad 284, so the second cable socket 280 has a structure suitable for waterproofing. The steel wire socket 227 may have a waterproof structure similar to the second cable socket.

Figure 6:
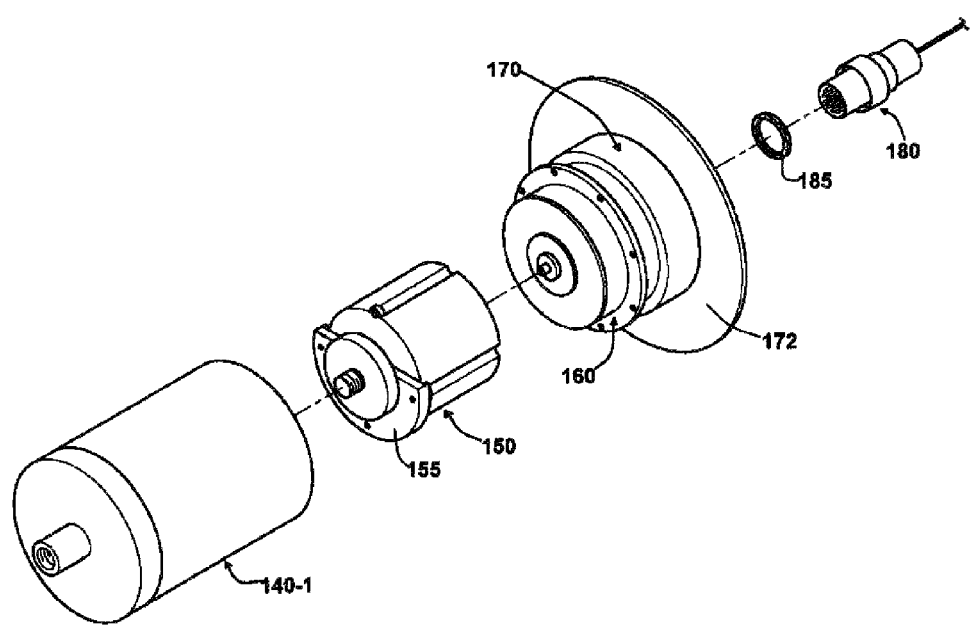
FIG. 6 is a dismantle perspective view of the inner part of the first pig to be applied to the present invention.

FIG. 6 is a dismantle perspective view of the inner part of the first pig to be applied to the present invention. Referring to FIG. 6. The first pig includes internal body (140-1) and sensor unit (150) of 3 acceleration sensor and 3 gyro sensor which is inserted to internal body, Control Board (160) of sensor unit and Memory, cable from Battery (170) is connected to sensor, controller and Encoder and external body setting battery and Cable Connecter. Battery is a source of encoder and Controller and controller receive a data from Encoder and memorize the data.

Figure 7:
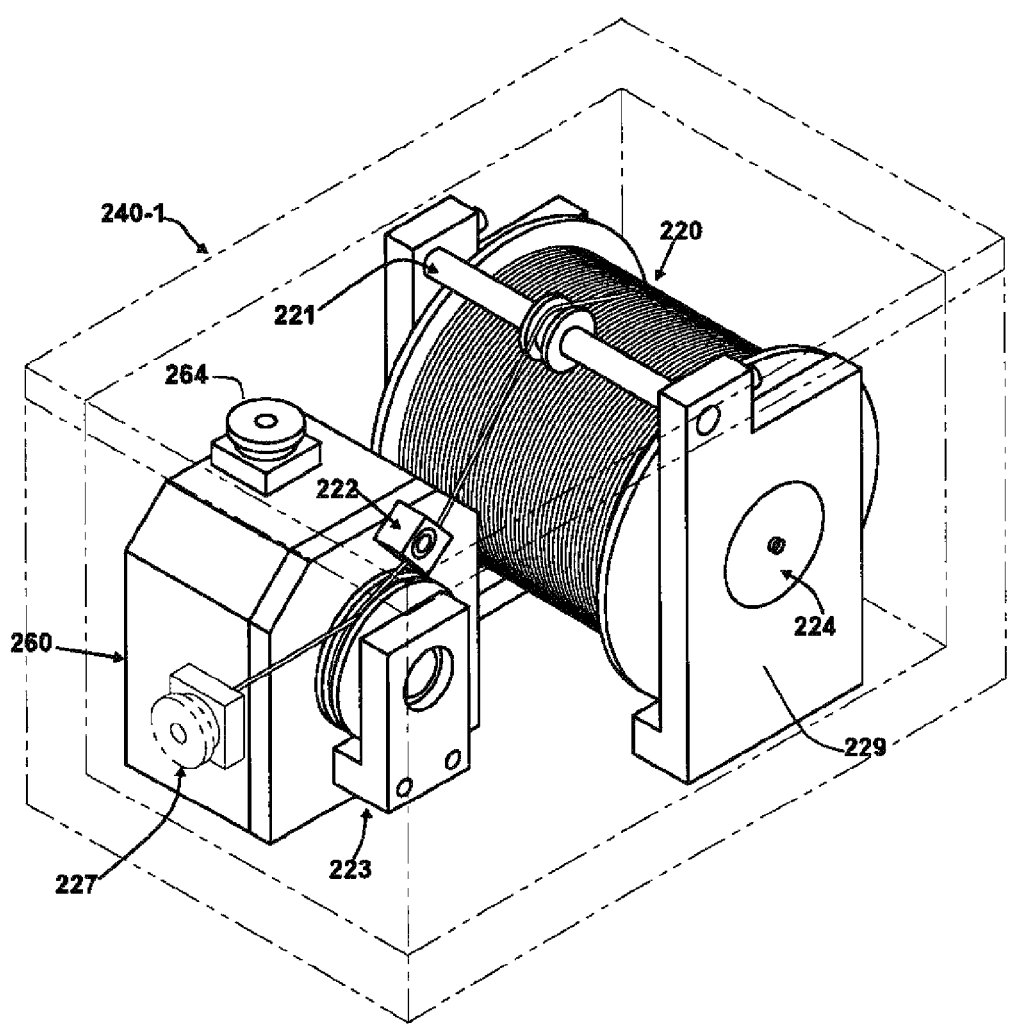
FIG. 7 is a perspective view of an internal body of a second pig to be applied to the present invention.

FIG. 7 is a perspective view showing the inside of the internal body of the second pig to be applied to the present invention. Referring to FIG. 7, the internal body 240-1 of the second pig 200 applied to the present invention accommodates: the reel 220 that is rotatably disposed between two supports fixed to the bottom of the internal body 240-1 and winds/releases the steel wire 221-1; the tension adjuster 224 that is disposed on one of the supports 229 for the reel; the first guide 221 that is disposed over the reel 220 and guides the steel wire; the guide hole 222 that guides the steel wire from the first guide 221 to the center of the second guide; and the encoder 260 to which the guide hole 222 the second guide 223, and the steel wire socket 227 are coupled and that has the encoder socket 264 in which a cable is inserted. Further, the external body 240 accommodates the internal body 240-1, the steel socket 227 is disposed at the second sides of the internal body 240-1 and the external body 240 in a waterproof structure and guides the steel wire guided by the second guide 223 to the outside of the second pig 200, and the second disc 220-7 is coupled to the second side of the external body with the steel wire socket 227.

Figure 8:
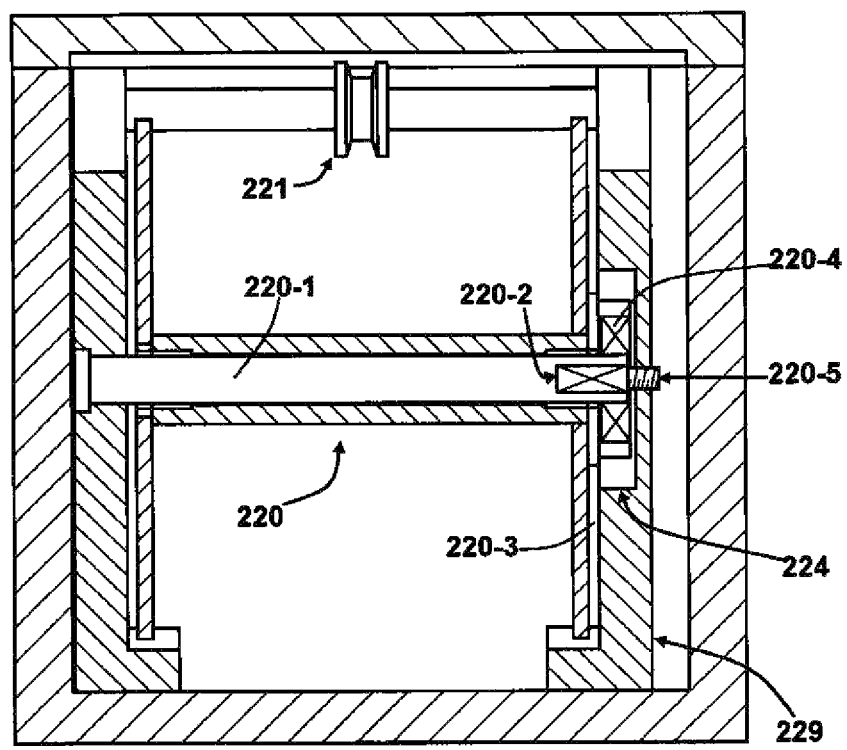
FIG. 8 is a view showing a tension adjuster to be applied to the mapping probe of the invention.

FIG. 8 is a cross-sectional view of the tension adjuster of the reel applied to the present invention. Referring to FIG. 8, the tension adjuster 224 of the reel to be applied to the present invention has: a thread portion 220-2 formed at a first end of a central shaft 220-1 of the reel, at a first side of the reel; an urethane pad 220-3 for tension adjustment coupled to the thread portion; a bearing 220-4 fitted on the urethane pad for tension adjustment; and an adjusting bolt 220-5 inserted in the thread portion, rotated by the bearing, and adjusting torque of the reel by adjusting force applied to the urethane pad for tension adjustment. According to the tension adjuster 224, when the adjusting bolt is turned clockwise or counterclockwise, the urethane pad 220-3 for tension adjustment adjusts the force applied to the reel, so the torque of the reel is adjusted and accordingly tension in the steel wire 221-1 can be adjusted. As described above, the angular speed of the reel, is adjusted by adjusting the adjusting bolt and the releasing speed of the steel wire can be adjusted by adjusting the angular speed of the reel, so idle-releasing and tangling of the steel wire can be prevented.

Figure 9:
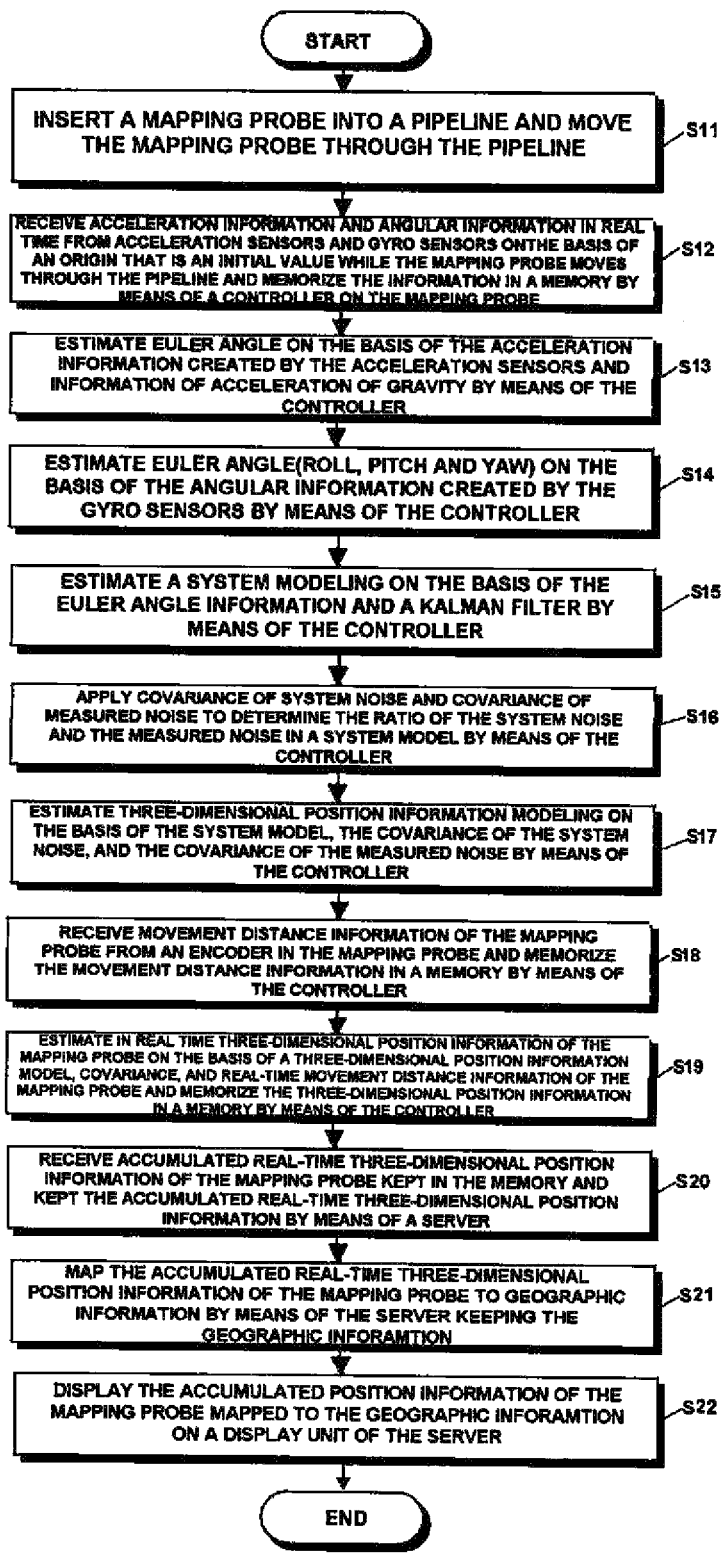
FIG. 9 is a flowchart illustrating control of a method of tracing the position of a pipeline using a mapping probe of the present invention.

FIG. 9 is a flowchart illustrating a method of tracing a position of a pipeline using a mapping probe of the present invention. Referring to FIG. 9, the method of tracing a position of a pipeline using a mapping probe of the present invention includes: inserting the mapping probe into a tap water pipeline or, a sewer pipeline and moving the mapping probe through the pipeline (S11); receiving acceleration information and angular information in real time from acceleration sensors and gyro sensors on the basis of an origin (a, start point in the pipeline) that is an initial value while the mapping probe moves through the pipeline and keeping the information in a memory by means of a controller on the mapping probe (S12); estimating Euler angle (roll and pitch) on the basis of the acceleration information created by the acceleration sensors and information of acceleration of gravity by means of the controller (S13); estimating Euler angle (roll, pitch, and yaw) on the basis of the angular information created by the gyro sensors by means of the controller (S14); estimating a system modeling on the basis of the Euler angle information and a Kalman filter by means of the controller (S15); estimating and applying covariance of system noise and covariance of measured noise to determine the ratio of the system noise and the measured noise in a system model by means of the controller (S16); estimating three-dimensional position information modeling on the basis of the system model, the covariance of the system noise, and the covariance of the measured noise by means of the controller (S17); receiving movement distance information of the mapping probe from an encoder in the mapping probe and keeping the movement distance information in a memory by means of the controller (S18); estimating in real time three-dimensional position information of the mapping probe on the basis of a three-dimensional position information model, covariance, and real-time movement distance information of the mapping probe and keeping the three-dimensional position information in the memory by means of the controller (S19); receiving accumulated real-time three-dimensional position information of the mapping probe kept in the memory and keeping the accumulated real-time three-dimensional position information by means of a server (S20); mapping the accumulated real-time three-dimensional position information of the mapping probe to geographic information by means of the server keeping the geographic information (S21), and displaying the accumulated position information of the mapping probe mapped to the geographic information on a display unit of the server (S22). The estimating of Euler angle (roll and pitch) on the basis of the acceleration information and information of acceleration of gravity by means of the controller (S13) is achieved by three acceleration sensors and estimation of Euler angle (roll and pitch) on the basis of three-axial acceleration information created by the three acceleration sensors is as the following Description 1;

[Description 1]

The acceleration measured by the three-axial acceleration sensors includes acceleration of gravity and various accelerations by acceleration of the sensors and expressed as following Equation 1, $$a = \dot{v} + v \times \omega + gR^T \quad (\because R^T = R^{-1}) \quad \text{[Equation 1]}$$

$$= \begin{bmatrix} \dot{v}_x \\ \dot{v}_y \\ \dot{v}_z \end{bmatrix} + \begin{bmatrix} 0 & v_z & -v_y \\ -v_z & 0 & v_x \\ v_y & -v_x & 0 \end{bmatrix} \begin{bmatrix} \omega_x \\ \omega_y \\ \omega_z \end{bmatrix} + g \begin{bmatrix} -\sin\theta \\ \cos\theta\sin\phi \\ \cos\theta\cos\phi \end{bmatrix}$$

where, v is a linear speed, ω is an angular speed, and g is acceleration of gravity.

When v is zero and ω is zero in Equation 1, Euler angle is calculated as follows, $$\tan\phi_z = \frac{-a_y}{-a_x}, \sin\theta_z = \frac{-a_x}{g_z}.$$

$$\phi_z = \operatorname{atan2}(-a_y, -a_z), \theta_z = \operatorname{asin}\left(\frac{-a_x}{g_z}\right).$$

where $a = [a_x, a_y, a_z]^T$.

The estimating Euler angle (roll, pitch, and yaw) on the basis of the angular speed information by means of the controller (S14) is achieved by three gyro sensors and estimation of rotational speeds of Euler angle (roll, pitch, and yaw), that is estimation of angular speeds of the gyro sensors on the basis of the three-axial angular speed information created by the three gyro sensors can be achieved as in the following Equation 2, $$\begin{bmatrix} \omega_x \\ \omega_y \\ \omega_z \end{bmatrix} = C \begin{bmatrix} \dot{\phi} \\ \dot{\theta} \\ \dot{\psi} \end{bmatrix}, C = \begin{bmatrix} 1 & 0 & -\sin\theta \\ 0 & \cos\phi & \sin\phi\cos\theta \\ 0 & -\sin\phi & \cos\phi\cos\theta \end{bmatrix} \quad \text{[Equation 2]}$$

$$\begin{bmatrix} \dot{\phi} \\ \dot{\theta} \\ \dot{\psi} \end{bmatrix} = C^{-1} \begin{bmatrix} \omega_x \\ \omega_y \\ \omega_z \end{bmatrix}, C^{-1} = \begin{bmatrix} 1 & \sin\phi\tan\theta & \cos\phi\tan\theta \\ 0 & \cos\phi & -\sin\phi \\ 0 & \sin\phi/\cos\theta & \cos\phi/\cos\theta \end{bmatrix}$$

where $$\omega = (\omega_x, \omega_y, \omega_z)^T$$

Further, Euler angle (roll, pitch, and yaw) for the angular speeds of the gyro sensors is (F, θ, ψ) and differential of the Euler angle is differential of the three-axial angular speeds, so the three-axial angular speed information can be achieved.

Further, the estimating of system modeling on the basis of Euler angle information and a Kalman filter by means of the controller (S15) uses Euler angle (F, θ, ψ) as state variables, and a system model estimated on the basis of measured values and differential of the state variables is expressed as in Equation 3, $$\begin{Bmatrix} \phi' \\ \theta' \\ \varphi' \end{Bmatrix} = \begin{bmatrix} 1 & \sin\phi\tan\theta & \cos\phi\tan\theta \\ 0 & \cos\phi & -\sin\phi \\ 0 & \sin\phi \sec\theta & \cos\phi \sec\theta \end{bmatrix} \begin{Bmatrix} p \\ q \\ r \end{Bmatrix} + \quad \text{[Equation 3]}$$

$$w \; z = \begin{bmatrix} 100 \\ 010 \end{bmatrix} \begin{Bmatrix} \phi \\ \theta \\ \varphi \end{Bmatrix} + v$$

where p, q, r are angular speeds measured by the gyro sensors, w is system noise, z is a measured value, and v is measured noise.

Further, experimental values of covariance Q of noise of the system model and covariance R of measured noise are as in the following Equation 4.

$$Q = \begin{Bmatrix} 0.0001 & 0 & 0 \\ 0 & 0.0001 & 0 \\ 0 & 0 & 1 \end{Bmatrix}, R = \begin{Bmatrix} 1 & 0 \\ 0 & 2 \end{Bmatrix} \quad \text{[Equation 4]}$$

Accordingly, the estimating of three-dimensional position information of the mapping probe in real time on the basis of the system modeling, covariance, and real-time movement information of the mapping probe can be achieved by the following Equation 5, $$\begin{Bmatrix} x_k \\ y_k \\ Z_k \end{Bmatrix} = \begin{bmatrix} \sin\varphi \cdot \cos\theta \cdot \cos\phi \\ \cos\varphi \cdot \cos\theta \cdot \cos\phi \\ \sin\theta \cdot \cos\phi \end{bmatrix} \cdot u' + \begin{Bmatrix} x_{k-1} \\ y_{k-1} \\ Z_{k-1} \end{Bmatrix} \quad \text{[Equation 5]}$$

where $u' = enc_k - enc_{k-1}$.

In Equation 5, for example, $x_{K-1}$ is a sample value of a step right before $x_K$ and $x_K$ is the current sample value, and the posture (roll, pitch, and yaw) of the sensors of the mapping probe is transformed into the three-dimensional movement distances (x, y, and z).

$enc_k$: current sample value received by encoder $enc_{k-1}$: sample value right before current sample value received by encoder $enc_{k-2}$: value the same as two-step prior sample value from current sample received by encoder.

Figure 10:
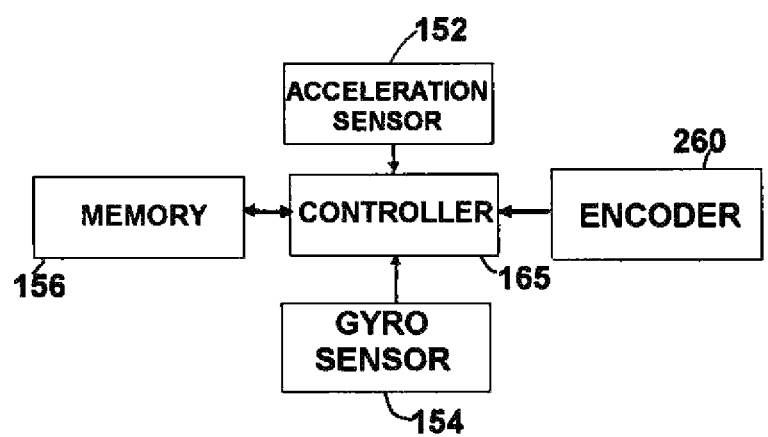
FIG. 10 is a view showing a controller to be applied to the present invention.

FIG. 10 is a view showing a controller to be applied to the present invention. The controller 165 applied to the present invention receives and keeps three-axial acceleration information from the three acceleration sensors 152, angular speed information from the three gyro sensors 154, and movement distance information from the encoder 260 in the memory 156, estimates Euler angle on the basis of the three-axial angular speed information and the three-axial acceleration information kept in the memory, performs system modeling on the basis of the Euler angle and a Kalman filter kept in the memory, estimates covariance of system noise and measured noise in the system model, estimates three-dimensional position information modeling for the system on the basis of the system model and the covariance, and estimates and keeps in real time three-dimensional position information of the mapping probe in the memory on the basis of the three-dimensional position information modeling, covariance, and movement distance information received from the encoder.

It will be apparent to those skilled in the art that various modifications can be made to the above-described exemplary embodiments of the present invention without departing from the spirit or scope of the invention. Thus, the preferred embodiments described above are exemplary in all aspects in different forms and should not be construed as limited to the embodiments set forth herein. The essential technical scope of the present invention is disclosed in the appended claims, and it is intended that the present invention cover all such modifications provided within the scope of the claims and their equivalents.

What is claimed is:

1. A pipe mapping probe apparatus of memorizing position data collected from the pipe mapping probe apparatus tracing a position of a pipeline, the apparatus comprising:
    a first disc (120) that is fitted and fastened on a shaft member (110) thread-fastened to the inner side of a connection shaft at a first side of an internal body (140-1) of a first pig (100);
    a cap (115) coupled to a side of the shaft member (110) outside the first disc;
    the first pig (100) coupled to the shaft member and surrounding a sensor unit coupled to an auto balancing, a control board coupled to the sensor unit, and a battery coupled to the control board;
    a first plate (130) that is fastened to a first side of an external body (140) of the first pig (100);
    elastic members (300) that are composed of three flexible springs coupled to a second side of the external body (140) of the first pig;
    a cable (111) that electrically connects the battery, the sensor unit, and the control board of the first pig (100) and an encoder of a second pig (200), is connected with the battery through a first cable socket coupled to the external body of the first pig, and is connected to the encoder (260) through a second cable socket (280) disposed at the center of a second plate coupled to a first side of the second pig (200) and through an encoder socket (264) on the top of the encoder disposed in an internal body (240-1) of the second pig;
    the second pig (200) that is coupled to second sides of the elastic members at the first side of the second pig (200) and coupled to the second plate (230), which is coupled to the second cable socket (280) at the center, at the first side; and
    a second disc (220-7) that is disposed on a second side of the external body (240) of the second pig,
    wherein the sensor unit is achieved by acceleration sensors and gyro sensors, and
    wherein the pipe mapping probe apparatus is achieved by receiving acceleration information and angular information in real time from the acceleration sensors and the gyro sensors on the basis of origin (a start point in the pipeline) and memorizing data (information), and estimating Euler angle (roll and pitch) on the basis of acceleration information and information of acceleration of gravity, and estimating Euler angle (roll, pitch and yaw) on the basis of the angular information created by the gyro sensors and estimating a system modeling on the basis of the Euler angle information and Kalman Filter, and estimating and applying covariance of system noise and covariance of measured noise to determine the ratio of the system noise and the measured noise in a system model, and estimating three-dimensional position information modeling on the basis of the system model, the covariance of the system noise and the covariance of the measured noise, and receiving movement distance information of the mapping probe from the encoder in the mapping probe, and memorizing the movement distance information in memory, and estimating in real time three-dimensional position information of the mapping probe on the basis of a three-dimensional position information model, covariance and real-time movement distance information of the mapping probe, and memorizing the three-dimensional position information in memory.

2. The apparatus of claim 1, wherein the sensor unit is achieved by three acceleration sensors and three gyro sensors.

3. The apparatus of claim 2, wherein the reel is achieved by including a tension adjuster of the reel.

4. A pipe mapping probe apparatus of memorizing position data collected from the pipe mapping probe apparatus tracing a position of a pipeline, the apparatus comprising:
    a first disc (120) that is fitted and fastened on a shaft member (110) thread-fastened to the inner side of a connection shaft at a first side of an internal body (140-1) of a first pig (100);
    a cap (115) coupled to a side of the shaft member (110) outside the first disc;
    the first pig (100) coupled to the shaft member and surrounding a sensor unit coupled to an auto balancing, a control board coupled to the sensor unit, and a battery coupled to the control board;
    a first plate (130) that is fastened to a first side of an external body (140) of the first pig (100);
    elastic members (300) that are composed of three flexible springs coupled to a second side of the external body (140) of the first pig;
    a cable (111) that electrically connects the battery, the sensor unit, and the control board of the first pig (100) and an encoder of a second pig (200), is connected with the battery through a first cable socket coupled to the external body of the first pig, and is connected to the encoder (260) through a second cable socket (280) disposed at the center of a second plate coupled to a first side of the second pig (200) and through an encoder socket (264) on the top of the encoder disposed in an internal body (240-1) of the second pig;
    the second pig (200) having the second plate (230), which has a second cable socket (280) on second sides of the elastic members, on a first side, and including therein a reel (220) that winds/releases a steel wire (221-1), a tension adjuster (224) that adjusts rotation of the reel, a first guide (221) that is disposed on the reel and guides the steel wire released, a guide hole (222) that guides the steel wire released from the first guide to the center, a second guide (223) that guides the steel wire released from the guide hole to a steel wire socket (227), an encoder socket (264) through which the cable (111) is inserted for connection with the encoder, an internal body (240-1) of the second pig that accommodates the encoder (260) calculating a movement distance of the mapping probe in a pipeline on the basis of the length of the steel wire (221-1) released from the reel (220) and transmitting information of the movement distance to the control board (160) through a cable, an external body (240) that is disposed outside the internal body (240-1); and a second disc (220-7) that is disposed on a second side of the external body (240) of the second pig, wherein the sensor unit is achieved by acceleration sensors and gyro sensors, and wherein the pipe mapping probe apparatus is achieved by receiving acceleration information and angular information in real time from the acceleration sensors and the gyro sensors on the basis of origin (a start point in the pipeline) and memorizing data (information), and estimating Euler angle (roll and pitch) on the basis of acceleration information and information of acceleration of gravity, and estimating Euler angle (roll, pitch and yaw) on the basis of the angular information created by the gyro sensors and estimating a system modeling on the basis of the Euler angle information and Kalman Filter, and estimating and applying covariance of system noise and covariance of measured noise to determine the ratio of the system noise and the measured noise in a system model, and estimating three-dimensional position information modeling on the basis of the system model, the covariance of the system noise and the covariance of the measured noise, and receiving movement distance information of the mapping probe from the encoder in the mapping probe, and memorizing the movement distance information in memory, and estimating in real time three-dimensional position information of the mapping probe on the basis of a three-dimensional position information model, covariance and real-time movement distance information of the mapping probe, and memorizing the three-dimensional position information in memory.

5. A pipe mapping probe apparatus of memorizing position data collected from the pipe mapping probe apparatus tracing a position of a pipeline, the apparatus comprising:

a first disc (120) that is fitted and fastened on a shaft member (110) thread-fastened to the inner side of a connection shaft at a first side of an internal body (140-1) of a first pig (100);

a cap (115) coupled to a side of the shaft member (110) outside the first disc;

the first pig (100) coupled to the shaft member and having an external body surrounding a sensor unit coupled to an auto balancing, a control board coupled to the sensor unit, and a battery coupled to the control board;

a first plate (130) that is fastened to a first side of an external body (140) of the first pig (100);

elastic members (300) that are composed of three flexible springs coupled to a second side of the external body (140) of the first pig;

a cable (111) that electrically connects the battery, the sensor unit, and the control board of the first pig (100) and an encoder of a second pig (200), is connected with the battery through a first cable socket coupled to the external body of the first pig, and is connected to the encoder (260) through a second cable socket (280) disposed at the center of a second plate coupled to a first side of the second pig (200) and through an encoder socket (264) on the top of the encoder disposed in an internal body (240-1) of the second pig;

the second pig (200) having the second plate (230), which has a second cable socket (280) on second sides of the elastic members, on a first side, and including therein a reel (220) that winds/releases a steel wire (221-1), a tension adjuster (224) that adjusts rotation of the reel, a first guide (221) that is disposed on the reel and guides the steel wire released, a guide hole (222) that guides the steel wire released from the first guide to the center, a second guide (223) that guides the steel wire released from the guide hole to a steel wire socket (227), an encoder socket (264) through which the cable (111) is inserted for connection with the encoder, an internal body (240-1) of the second pig that accommodates the encoder (260) calculating a movement distance of the mapping probe in a pipeline on the basis of the length of the steel wire (221-1) released from the reel (220) and transmitting information of the movement distance to the control board (160) through a cable, an external body (240) that is disposed outside the internal body (240-1); and a second disc (220-7) that is disposed on a second side of the external body (240) of the second pig, wherein the pipe mapping probe apparatus is characterized by receiving acceleration information and angular information in real time from acceleration sensors and gyro sensors on the basis of origin (a start point in the pipeline), and memorizing data (information), and estimating Euler angle (roll and pitch) on the basis of acceleration information and information of acceleration of gravity, and estimating Euler angle (roll, pitch and yaw) on the basis of the angular information created by the gyro sensors, and estimating a system modeling on the basis of the Euler angle information and Kalman Filter, and estimating and applying covariance of system noise and covariance of measured noise to determine the ratio of the system noise and the measured noise in a system model, and estimating three-dimensional position information modeling on the basis of the system model, the covariance of the system noise and the covariance of the measured noise, and receiving movement distance information of the mapping probe from the encoder in the mapping probe, and memorizing the movement distance information in memory, and estimating in real time three-dimensional position information of the mapping probe on the basis of a three-dimensional position information model, covariance and real-time movement distance information of the mapping probe, and memorizing the three-dimensional position information in memory.

6. The apparatus of claim 5, the above system model is:

$$\begin{Bmatrix} \phi' \\ \theta' \\ \varphi' \end{Bmatrix} = \begin{bmatrix} 1 & \sin\phi\tan\theta & \cos\phi\tan\theta \\ 0 & \cos\phi & -\sin\phi \\ 0 & \sin\phi\sec\theta & \cos\phi\sec\theta \end{bmatrix} \begin{Bmatrix} p \\ q \\ r \end{Bmatrix} + wZ = \begin{bmatrix} 1 & 0 & 0 \\ 0 & 1 & 0 \end{bmatrix} \begin{Bmatrix} \phi \\ \theta \\ \varphi \end{Bmatrix} + v$$

where (F, θ, ψ) is Euler angle, p, q, and r are angular speeds measured by the gyro sensors, w is system noise, z is a measured value, and v is measured noise.

7. The apparatus of claim 6, wherein the above three-dimensional position information model is:

$$\begin{Bmatrix} x_k \\ y_k \\ Z_k \end{Bmatrix} = \begin{bmatrix} \sin\varphi \cdot \cos\theta \cdot \cos\phi \\ \cos\varphi \cdot \cos\theta \cdot \cos\phi \\ \sin\theta \cdot \cos\phi \end{bmatrix} \cdot u' + \begin{Bmatrix} x_{k-1} \\ y_{k-1} \\ Z_{k-1} \end{Bmatrix}$$

where $u' = enc_k - enc_{k-1}$, $x_{K-1}$ is a sample value of a step right before $x_K$ and $x_K$ is the current sample value, $enc_k$: current sample value received by encoder, $enc_{k-1}$: sample value right before current sample value received by encoder, and $enc_{k-2}$: value the same as two-step prior sample value from current sample received by encoder.

* * * * *